June 27, 1967
R. W. RYNO
3,328,659
SWITCHING APPARATUS FOR PLURAL STEP MOTORS
CONNECTED BY DIFFERENTIAL GEARING
Original Filed Feb. 18, 1963
3 Sheets-Sheet 1
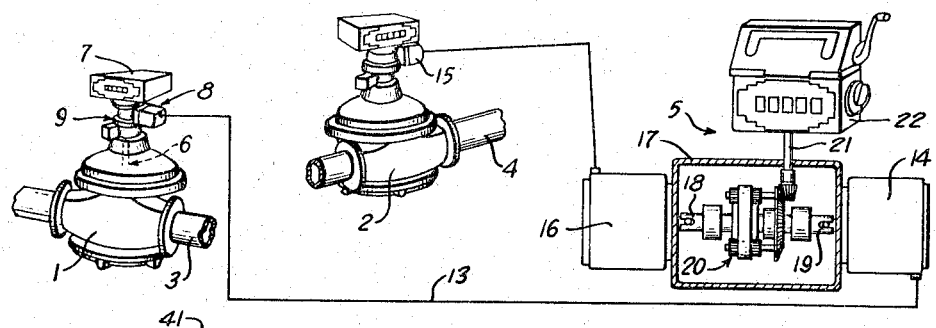
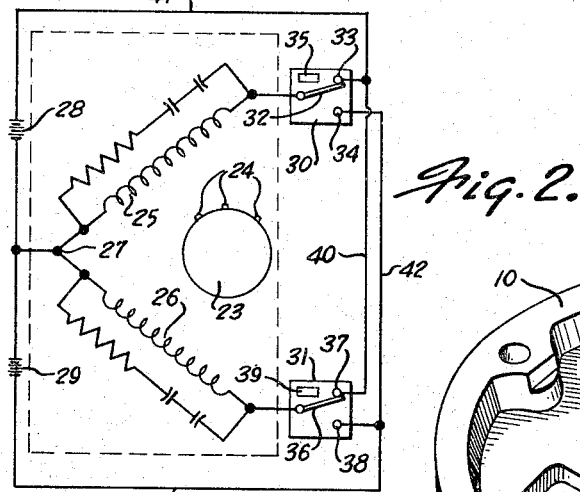
INVENTOR.
ROBERT W. RYNO
BY
Andrus & Starke
ATTORNEYS June 27, 1967  R. W. RYNO  3,328,659
SWITCHING APPARATUS FOR PLURAL STEP MOTORS
CONNECTED BY DIFFERENTIAL GEARING
Original Filed Feb. 18, 1963  3 Sheets-Sheet 2

INVENTOR.
ROBERT W. RYNO
BY Andrus & Starke
ATTORNEYS

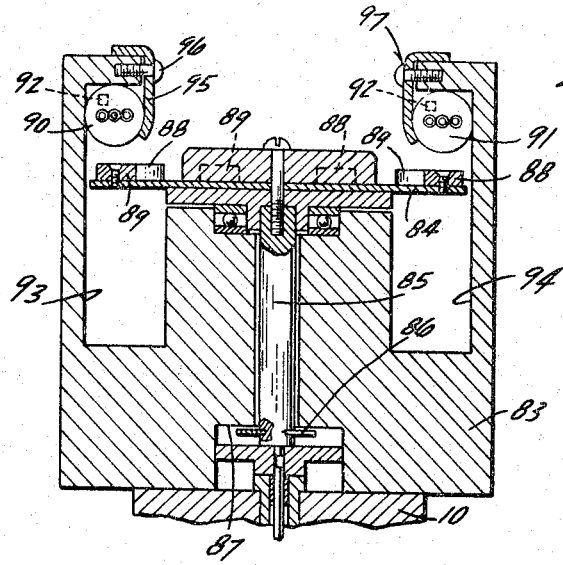
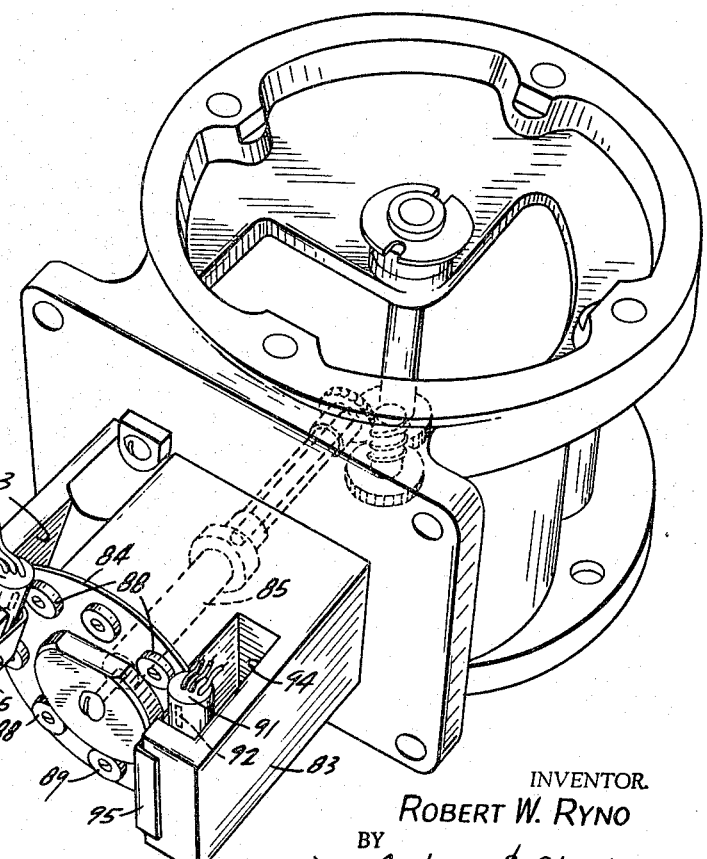
INVENTOR.
ROBERT W. RYNO
BY Andrus & Starke
ATTORNEYS,

United States Patent Office 3,328,659
Patented June 27, 1967

3,328,659
SWITCHING APPARATUS FOR PLURAL STEP MOTORS CONNECTED BY DIFFERENTIAL GEARING
Robert W. Ryno, Milwaukee, Wis., assignor to A. O. Smith Corporation, Milwaukee, Wis., a corporation of New York
Original application Feb. 18, 1963, Ser. No. 259,462, now Patent No. 3,250,866, dated May 10, 1966. Divided and this application Dec. 16, 1965, Ser. No. 514,252
5 Claims. (Cl. 318—138)

This application is a division of application Ser. No. 259,462, filed Feb. 18, 1963 and entitled Magnetic Switching Apparatus With Adjustable Switch Positions, now Patent No. 3,250,866. This invention relates to a switching apparatus and particularly to a magnetically operated switching apparatus constituting a pulse logic transmitter for producing impulses for controlling or operating a stepping motor or other load.

In digital control and recording systems, translating devices are often necessary to translate analog movements into electrical impulses for controlling and operating digital output devices and are known as analog to digital encoders. For example, in the metering of fluid flows for petroleum products and the like, pulse generating units are connected to be driven by a meter and establish a train of digital pulses or signals of a frequency or repetition rate proportional to fluid flow. The digital signals are transmitted to a suitable remote recording device for making a record of the volume of flow.

Where the total flow through a plurality of separate lines is to be determined, a single counter may be actuated by separate flow responsive signal generators in each line. The outputs of all generators are combined either electrically or mechanically. Electrical and electromechanical signal combining devices which are available have certain disadvantages from cost, maintenance and service considerations as well as structural complexity which require special skills and experience to understand and describe the system.

Further, many pulse generating units establish low power signals and pulse shaping and amplifying circuits employing flip-flops and/or other logic elements necessarily employed to properly condition the pulses for operation of a recording unit.

Applicant has found that a particularly inexpensive, reliable and simple means for totalizing separate pulse trains is provided by driving stepping motors which have incremental output movements in accordance with the digital inputs and which may be readily mechanically combined to produce a total of the individual inputs by a differential or the like for driving a totalizing register. Stepping motors may be constructed as synchronous permanent magnet motors with a multiple pole rotor driven by selective energization of a pair of field windings. When a direct current voltage is applied to the field windings, the rotor is locked into a magnetically held position. By alternately switching the polarity connection of the voltages applied to the windings in accordance with a predetermined sequence, the rotor will advance in equal increments or steps. For example, single-pole, double-throw switches may connect the windings to a direct current (D.C.) power source. The switches are alternately actuated to reverse the polarity or phase connection of the windings to the power source. Stepper motors of this type are rugged and reliable units with each step being made instantly without slip or chatter in view of the elimination of ratchets or similar devices. The stepper motor also has a large holding torque and provides precise stepped movement.

In accordance with this invention, a new and improved magnetically actuated switching mechanism produces a pulse logic output which may be connected for direct connection and operation of a stepper motor.

In accordance with the present invention, magnetically responsive switches are mounted in spaced relation for simultaneous relative movement through an effectively intermittent magnetic actuating field means with means to switch or change the coupling of the field means to the switches at a constant frequency or repetition rate. The switches are carried by a common support and at least one of the switches is adjustably mounted thereon for adjusting the spacing therebetween to allow adjustment of the timing of the sequential operation of the switches.

More particularly as applied to a dual winding stepping motor, the switches are sequentially actuated with equal on-off periods. Further, the switches must be actuated in proper time spaced sequence; that is, the on-off cycles of the pair of switches must be displaced by ninety degrees or one-quarter of a cycle. The adjustable mounting of at least one of the switches allows proper spacing of the switches to provide this desired operating phase relationship therebetween.

In accordance with this invention, a scanner of magnetic material is coupled to be driven by the motion which is to be encoded into a digital or pulse train signal. The scanner includes a plurality of alternate areas or portions which have different magnetic reluctance; for example, spaced magnetic interruptions or air gaps in a circular magnetic plate. A magnetic field unit, preferably of a permanent magnet type is suitably mounted with spaced north and south poles located immediately below the plane of the scanner such that the magnetic reluctance of the scanner directly affects the flux distribution of the magnetic field. On the opposite side of the scanner from the magnetic field unit, a magnetically responsive reed switch or the like is adjustably mounted for movement relative to the magnetic interruptions of said scanner and magnetic field units. The switch is actuated by the change in the magnetic field as the different portions of the scanner move between the switching and the field unit. The on and off periods of the switch are determined by the perpendicular positioning of the switch with respect to the interruptions and by the distance between the scanner and the switch or magnet and may coincide or vary in accordance with a desired pattern to produce a train of pulses in an energizing circuit including the switch.

With the present invention incorporated to drive a stepper motor, a pair of switch units are mounted in generally diametrically opposite position in operative relation to a scanner wheel having a plurality of equicircumferentially spaced radial slits or slots. Magnetic members are mounted on opposite sides of the wheel in operating alignment with the respective switch units. The pair of switch units are offset with respect to the scanner wheel by a factor of one-half the distance between the operating magnetic discontinuities such that with a slit aligned with one switch unit, a complete wheel sector is aligned with the other. The switch units are separately adjustably mounted for adjusting the symmetry of the opening and closing of each switch unit. Further, in order to provide for the necessary precise phasing of the switching required to properly sequence the stepper motor, at least one switch unit and the associated magnet member are carried by a common support which is adjustably mounted with respect to the wheel.

The adjustable mounting of the switch units and of the one combined magnet member and associated switch permits adjustments for manufacturing tolerances of the several components. The proper alternate switching of the two switches can then be established without requiring exceedingly high degree of manufacturing tolerances in the components.

In accordance with another aspect of the present invention, the pair of switches may be of bistable variety which are magnetically responsive in a manner whereby one polarity established the one stable state and an opposite polarity establishes the second stable state. A self-latching magnet or the like holds the switch in either established position until an opposite polarity field is impressed on the switch to reverse the state. The latching force can be relatively small and as a result the actuating force can be small. However, opposite polarity fields must be sequentially impressed on the switch. A rotating disc having circumferentially spaced permanent magnet portions with adjacent portions oppositely polarized provides proper actuation of the switches.

However, the relative position of the switches is made adjustable to permit proper phasing of the switches for operation of a stepping motor or the like.

The present invention thus provides a switching apparatus constituting a pulse logic transmitter for establishing precise electrical control and direct operation of a direct current motor. The switching apparatus is relatively inexpensive, simple and rugged and has an exceedingly long life. Further, the complete logic transmitter is a small module which can be mounted directly on a usual meter for metering the flow of fluid and the like.

The drawings furnished herewith illustrate the best mode presently contemplated for carrying out the invention.

In the drawings:

FIG. 1 is a diagramatic view of a metering and recording system for a pair of flow lines;

FIG. 2 is a schematic circuit diagram of the stepping motor and switching system;

FIG. 3 is an enlarged pictorial view of the pulse logic transmitter constructed in accordance with the present invention and incorporating the switching system of FIG. 2;

FIG. 7 is a fragmentary view showing a second embodiment of a switch operating mechanism with a portion of a transmitting housing shown similar to the illustration of FIG. 3; and FIG. 8 is a horizontal section through the second embodiment similar to FIG. 5.

Figure 4:
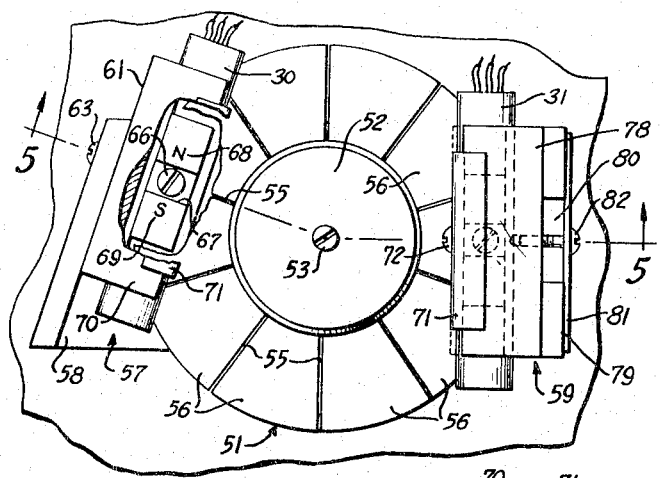
FIG. 4 is an enlarged end view of the transmitter.

Referring to the drawings and particularly to FIG. 1, a metering and recording system is illustrated including a pair of meters 1 and 2 connected respectively in series in the flow lines 3 and 4 which may transport a suitable liquid such as gasoline or other petroleum products. The meters 1 and 2 may be of any suitable or known construction adapted to establish an output in accordance with the flow therethrough and are described hereinafter with reference to meter 1 and in such detail as required for a clear and complete description of the present invention. A central totalizing counter or register unit 5 is mounted at a control center and coupled to the meters 1 and 2 as subsequently described to record the total flow of the liquid through the lines 3 and 4. Meter 1 includes an output shaft assembly 6 driven in accordance with and in proportion to the volume of liquid flow through line 3. A local counter or register 7 is mounted on the top of meter 1 and driven by shaft assembly 6 to register the volume of flow through line 3. A pulse logic transmitter 8 is coupled to the shaft assembly 6 by a coupling unit 9 interposed between meter 1 and register 7, and establishes a train of operating pulses per revolution of the shaft assembly 6.

Referring particularly to FIG. 3, the illustrated coupling unit 9 includes a housing 10 through which shaft assembly 6 projects into operative connection to register 7. A transmitting shaft 11 is coupled by a suitable gear reduction train 12 to shaft assembly 6 and extends perpendicularly and horizontally therefrom into the pulse logic transmitter 8 which is attached to housing 10. A transmission cable 13 is connected to the output of the transmitter 8 and to a stepper motor 14 which is mounted with and forms a part of central totalizing counter or a register unit 5. The stepper motor 14 is actuated to establish an incremental rotary output in accordance with each pulse of the transmitter 8.

Meter 2 corresponds in structure to meter 1 and is similarly connected to actuate a pulse logic transmitter 15 corresponding to transmitter 8. The transmitter 15 is connected to drive a stepper motor 16 and establish an incremental rotary output in accordance with the volume of flow through the flow line 4.

A mechanical combinator 17 interconnects the outputs of motors 14 and 16 for operating the register unit 5 and recording of the combined flow in lines 3 and 4. Mechanical combinator 17 is illustrated with a known differential construction which includes a pair of input shafts 18 and 19 connected one each to the rotary output of motors 14 and 16. A differential gearing 20 interconnects the shafts 18 and 19 to drive an output shaft 21. A counter or register 22 forming a part of unit 5 is driven by shaft 21 in accordance with the combined movement of shafts 18 and 19 and therefore the total flow through lines 3 and 4.

Register unit 5 and combinator 17 may be of any well known construction and no further description thereof is included herein.

Stepper motors 14 and 16 are preferably both permanent magnet type synchronous motors adapted to be driven from a direct current source. Motor 14 is specifically described and is schematically shown in FIG. 2.

Referring particularly to FIG. 2, the motor 14 includes a permanent magnet rotor 23 diagrammatically shown with a plurality of projecting pole members 24 between a pair of field windings 25 and 26. The windings 25 and 26 are wound on a suitable stator structure, not shown, within which rotor 23 is suitably mounted. Windings 25 and 26 have a common power terminal 27 formed by the interconnection of corresponding ends thereof. Common terminal 27 is connected to the opposite sides of a pair of identical direct current power sources shown as batteries 28 and 29. Single pole double throw switch units 30 and 31 which form a part of transmitter 8 are connected respectively to the opposite ends of windings 25 and 26 for completing independent input connection to batteries 28 and 29.

Switch unit 30 includes a movable contact arm 32 which is connected to field winding 25 and a pair of alternately engaged contacts 33 and 34. Arm 32 is urged into engagement with the contact 33 in any suitable manner, shown diagrammatically as a biasing magnet 35.

Similarly, the single pole, double throw switch unit 31 includes a contact arm 36 connected to the input end of the field winding 26 and a pair of contacts 37 and 38. A magnet 39 normally holds contact arm 36 in engagement with contact 37.

Contacts 33 and 37 are interconnected by a jumper lead 40 and to the positive side of the battery 28 by lead 41. Contacts 34 and 38 are interconnected by a jumper lead 42 and connected by a lead 43 to the negative side of battery 29.

If the switch units 30 and 31 are now properly operated in a predetermined switching sequence to reverse the phase or polarity of energizations of windings 25 and 26 alternately, rotor 23 advances a predetermined angular amount for each switching operation. In FIG. 2, switch units 30 and 31 are shown in an assumed starting position. If the position of switch unit 30 is reversed, the polarity of the winding 25 is reversed and the rotor 23 moves one step. To effect another step, the polarity of winding 26 must be reversed by changing the position of the switch unit 31. A third step is effected by returning switch unit 30 to the full line position shown in FIG. 2. A fourth step is effected by moving switch unit 31 to the original full line position shown in FIG. 2. A continuous stepping movement of the rotor 23 is thus provided by repetitious establishment of this switching sequence. In accordance with one commercially available construction, 200 precise steps are effected in each complete revolution of the rotor with each step being precisely 1.8 degrees within a tolerance of plus or minus .09 degree noncumulative.

In accordance with the present invention, the switch units 30 and 31 form an integrated part of the pulse logic transmitter 8, a preferred construction of which is shown in FIGS. 3–6.

Figure 5:
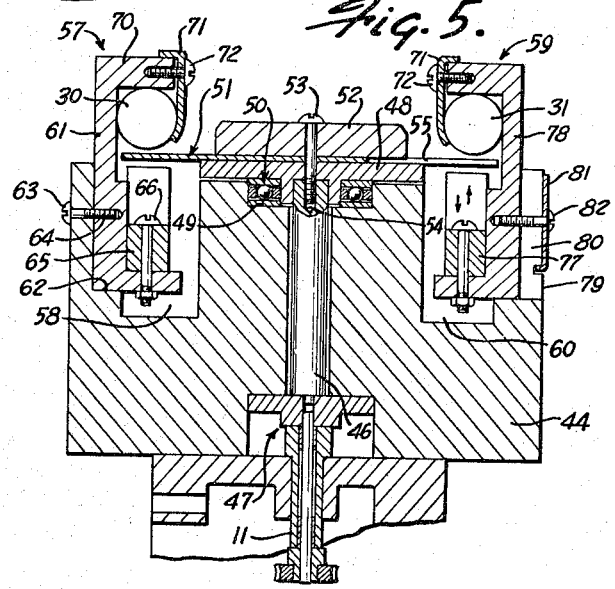
FIG. 5 is a central section of the transmitter taken on line 5—5 of FIG. 4.

Referring particularly to FIGS. 3–5, the illustrated pulse logic transmitter 8 includes block-like base 44 attached to the housing 10 by suitable bolts 45. A spindle 46 is rotatably mounted in an axial opening in the middle of frame 44 and the inner end is coupled to the transmitting shaft 11 by a tongue and groove connection 47. A disc 48 is secured to the outer end of the spindle 46 and includes an enlargement projecting inwardly into a recess 49 in the base 44. A ball bearing thrust unit 50 is disposed within the recess to rotatably support the disc 48.

A scanner wheel 51 is clamped against disc 48 by a circular clamping plate 52 which is secured to the spindle 46. A small clamping bolt 53 projects through an opening in the clamping plate 52 and threads into a suitably tapped opening 54 in the spindle 46.

Scanner wheel 51 is formed of sheet steel or other magnetic material and includes ten equicircumferentially spaced radial slits or slots 55 which project inwardly approximately one-third of the diameter of the wheel and define complete wheel sectors 56 therebetween. Each slot 55 is a relatively narrow air gap and constitutes an operative magnetic discontinuity. For example, a wheel 51 having a diameter of three inches may have slots 56 which are approximately one inch long and with the edges spaced about one thirty second of an inch.

Although described and shown specifically as air gaps, a suitable nonmagnetic material may be inserted therein if so desired within the scope of the present invention. As subsequently described the magnetic reluctance must vary to operatively change a magnetic field on the outer side of the wheel 51.

A magnetically actuated switching assembly 57 which includes the switch unit 30 is fixedly secured within a recess 58 in the outer portion of base 44 and a similar magnetically actuated switching assembly 59 which includes switch unit 31 is adjustably secured within a recess 60 within base 44 and on the opposite side of spindle 46.

The magnetically actuated switch assembly 57 includes a channel-shaped mounting frame 61 which is formed of brass or other suitable nonmagnetic material. The frame 61 opens laterally toward wheel 51 and rests on a shoulder 62 formed on the outer wall of recess 58. Frame 61 is clamped within the recess by a clamping bolt 63 which passes through a suitable opening in the outer wall of recess 58 and threads into a tapped opening 64 in the base of the frame 61.

A permanent magnet 65 of the horseshoe type is fixed within the inner portion of frame 61 by a nut and bolt unit 66 which threads through a side leg of frame 61 and the base portion of magnet 65. The permanent magnet 65 includes a magnetic gap 67 immediately beneath the wheel 51 with circumferentially spaced north and south poles 68 and 69. The magnetic field between poles 68 and 69 extend through the area of the scanner wheel 51 and the strength of the flux on the outer side of wheel 51 is directly affected by the presence and absence of alignment of the magnetic gap with the slots 56 in the wheel. With a continuous sector of the wheel 51 overlying the magnetic gap 67, maximum concentration of flux exists in the wheel and in the presence of a slot 56, a minimum concentration of flux exists and a portion of the fields extends outwardly past the wheel 51 into operative coupling to the switch unit 30.

The permanent magnet 65 in cooperation with a similar magnet forming a part of switch assembly 59 as hereinafter described exerts an inward force on the wheel 51 which rotatably holds the wheel 51 and spindle 46 in position.

The switch unit 30 shown in FIGS. 3–6 is a tubular potted unit mounted within and adjacent the outer side arm 70 of the U-shaped frame 61 in alignment with the permanent magnet 65. A clamping plate 71 is releasably attached to the outer arm 70 by a clamping bolt 72 and bears in clamping engagement on the outer surface of the switch unit 30.

The switch unit 30 is located along a tangential line of the wheel 51 and is adjusted with respect to the permanent magnet 65 to insure proper movement of the switch arm 32, as hereinafter described.

Figure 6:
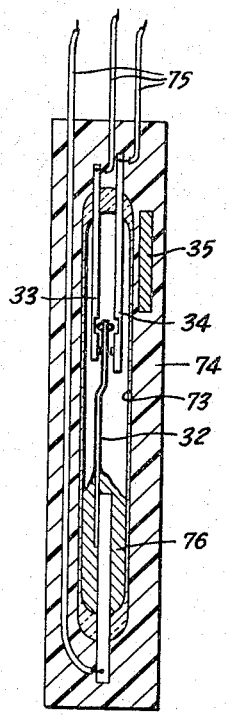
FIG. 6 is a longitudinal sectional view of a single-pole, double-throw switch structure incorporated in the transmitter of FIGS. 2–5, inclusive.

The switch unit 30, as most clearly shown in FIG. 6, is a break-before-make construction and includes a glass shell or capsule 73 having the contact arm 32 and the contacts 33 and 34 in the form of a leaf spring or reed contact members, which are similarly numbered in FIG. 6. Contact arm 32 projects through one end of the capsule 73 and is secured thereto by fusing of the glass or the like. Similarly, contacts 33 and 34 are supported in the opposite end with the contacts disposed on opposite sides of the inner end of arm 32. The capsule 73 is embedded within an outer protective potting compound 74 with the magnet 35 held therein in proper relation to contacts 33 and 34 to bias arm 32 into engagement with contact 33. The leads 75 for the respective contacts 33 and 34 and arm 32 project outwardly through one end of the unit 30 as most clearly shown in FIG. 3, the switch unit 30 is mounted with the glass capsule 73 disposed in a vertical direction and with the leaf spring contact arm 32 extending upwardly from the bottom thereof. A mercury pool 76 is preferably provided in the bottom of capsule 73. Capillary action causes the mercury 76 to cover the contact arm 32 and establish a mercury wetted contact surface providing an extremely long life expectancy and are of large current carrying capacity.

The magnetic switching assembly 59 is of the same construction as assembly 57 with switch unit 31 similarly mounted with respect to a magnet 77 by a frame 78 within recess 60. The wheel 51 rotates between switch unit 31 and magnet 77 to actuate the former. The switching assembly 59 is, however, adjustable as a unit with respect to the wheel 51, as follows. The outer wall 79 defining recess 60 is bifurcated and defines a laterally extending opening 80. A clamping plate 81 is disposed against the outer surface and a clamping bolt 82 passes through an opening therein and threaded into a suitably tapped opening in the mounting frame 78 of assembly 59. The outer wall 79 defining recess 60 is angularly related with respect to the corresponding portion defining recess 58 and therefor the switching assembly 59 is offset with respect to assembly 57. The angular offset equals one-half the angular displacement between slots 55 in scanner wheel 51. In this manner when a slot 55 is aligned with switching assembly 57, a complete sector 56 of wheel 51 is aligned with switching assembly 59, as shown in FIG. 4. Conversely, when a slot 55 is aligned with switching assembly 59, a complete sector 56 of wheel 51 is aligned with the switching assembly 57.

The operation of the illustrated embodiment of the invention is summarized as follows.

The meters 1 and 2 are driven in proportion to the flow through the respective flow line 3 and 4. The corresponding local registers 7 record the flow through the respective lines. The transmitting shafts 11 from each meter 1 and 2 rotate the spindles 46 and the associated scanner wheels 51 of logic transmitters 8 and 15 at a flow related angular velocity.

Rotation of each scanner wheel 51 through the related magnetic fields of the permanent magnets 65 and 77 of switching assemblies 57 and 59, respectively, causes alternate and opposite operation of the switch units 30 and 31.

Assume the scanner wheel 51 of transmitter 8 which is associated with line 3 rotates in a clockwise direction and at a particular instance is in the position shown in FIG. 4. A slot 55 is precisely aligned with and perpendicular to the switch unit 30 whereas a sector 56 of wheel 51 is aligned with and perpendicular to the switch unit 31. The complete sector 56 of wheel 51 aligned with switch unit 31 by-passes or holds the field of the associated permanent magnet 77 from influencing switch unit 31 which is therefore held in its normal position by the biasing magnet 39. In the presence of the slot 55, the magnetic field established by the permanent magnet 65 extends past wheel 51 and influences the switch unit 30. When aligned as shown in FIG. 4, the influence of magnet 65 overcomes the force of the small biasing magnet 35 and contact arm 32 disengages contact 33 and engages contact 34. The stepping motor 14 moves one step and actuates the register 22 through differential 17 to record the corresponding flow through line 3.

As the wheel 51 rotates in a clockwise direction, the slot 55 moves from alignment with switch unit 30 and a slot 55 on the opposite side moves toward and into alignment with the switch unit 31. As the slot approaches switch unit 31, it reverses its position. Simultaneously, a slot 55 leaves the switch unit 30 and begins to align a sector 56 with switch unit 30. However, the holding effect is such as to maintain the switch unit 30 closed until the slot 55 has moved completely therefrom. As a result, switch unit 30 maintains its actuated position but switch unit 31 reverses its position to engage arm 36 with contact 38 and effects a second step and drive of register 22.

The continued rotation of the wheel 51 through another half of a sector 56 of the slot 55 is completely removed from the switch unit 30 and a full sector 56 of wheel 51 is aligned therewith. The permanent biasing magnet 35 of unit 30 moves the switch arm 32 to the normal position engaging the contact 33. However, the opposite slot 55 associated at that time with the switch unit 31 has not moved sufficiently far to release the switch unit 31 and the stepping motor 14 executes another step which is recorded by register 22.

The rotation of the scanner wheel 51 thus alternately drives the single-pole, double-throw switch units 30 and 31 in a continuous and proper sequence such that stepper motor 14 establishes a series of precise step outputs.

The pulse logic transmitter 15 similarly drives stepping motor 16 in proportion to the flow through meter 2.

The outputs of motors 14 and 16 are combined by combiner 17 to actuate counter 22 and record the total flow through lines 3 and 4.

The illustrated structure is sensitive to the direction of input. Thus, if a reversal of the output is desired, the direction of the scanner wheel can be reversed or the circuit connection of contact arms 32 and 36 can be reversed.

To operate stepper motors 14 and 16 precisely, the associated switch units 30 and 31 of transmitters 8 and 15 must be in the alternate positions for equal periods. As a result, the positioning of the contact arms 32 and 36 of each transmitter with respect to the slots 55 is quite critical. The adjustable mounting of the individual switch units 30 and 31 in the respective frames 61 and 78 allows ready positioning thereof to effect the desired symmetry of switching action.

In the illustrated embodiment of the invention, the period of the alternate positions of the individual switches is set by the movement along the axis of the switches. If desired, a similar result can be obtained by mounting of the switches for movement toward and away from the scanner wheel.

Further, phasing of the switch units 30 and 31 must be proper and in a precisely timed sequence for high speed stepping. Each of the switch units 30 and 31 alternately connects the corresponding windings 25 and 26 to the sources 28 and 29 for opposite polarity energization. The position of each switch unit may be represented on a time scale as a square wave with the positive half cycle representing one switch position and the negative half cycle representing the second switch position. The frequency of the time waves is made identical by the setting of the switches to be in the alternate periods for the same time periods.

The phase of the representative time curves must be displaced by ninety degrees or one-quarter of a cycle to provide the proper logic sequence for operating the stepper motor 16. This adjustment is made in the embodiment of FIGS. 1–6 by the positioning of frame 78 which supports the switch unit 31 and the actuating magnet 77 with respect to switch unit 30. Assuming a fixed position of switch unit 30, the movement of frame 78 varies the timing of the alignment of slots 55 and the whole sectors 56 and thus shifts the switching time and the corresponding crossover points in the timer wave for switch unit 31.

The positioning of the switches is generally quite critical, particularly for very high speed counting or driving of the stepper motors. Two particularly satisfactory adjustment methods have been developed by applicant. In one method, the motor circuit is de-energized and an ohmmeter is connected to the respective switches during the adjusting procedure to ascertain the periods of switch operations and to allow adjustment for proper symmetry of the operation of each switch. To set the switches for proper phasing or sequential actuation of the switches, the ohmmeter is connected to both switches and the phase adjusting switch assembly moved to provide similar ohmmeter deflection. The other highly satisfactory method employs an oscilloscope with a small direct current energization of the motor circuit. The proper settings of the individual switches will provide a symmetrical square wave and the proper relative setting for proper phasing of the operation of the two switches provides equal durations of all levels of the resulting wave form.

In the first embodiment of the invention, the switch units 30 and 31 are shown as single-side or monostable switching units wherein the magnet 35 is constructed and arranged to hold the switch unit in one stable state. To hold the switch unit to the other stable state, an external magnetic force must be continuously applied to the switch. When such external force is removed, the magnet 35 automatically returns the switch unit to the single stable state. Although the illustrated system provides a highly satisfactory unit, the second embodiment of the invention shown in FIGS. 7 and 8 and described hereinafter employs a bistable switch unit which reduces the complexity of the system while maintaining the long life and reliable operation thereof. In FIGS. 7 and 8, elements corresponding to elements of FIGS. 1–6 are similarly numbered for simplicity and clarity of explanation.

Referring particularly to FIGS. 7 and 8, an E-frame 83 is shown secured to the housing 10 generally in accordance with the mounting of frame 44 on housing 10 of the first embodiment. A solid disc 84 is carried on the outer end of shaft 85 which is rotatably mounted in the central leg of the frame 83 and coupled to the transmitting shaft 11. The disc 84 is formed of any suitable non-magnetic material and rotatably secured within the E-frame 83 by a split ring 86 disposed in a circumferential groove in the inner end of the disc mounting shaft 85 and bearing on the inner surface 87 of frame 83.

A first plurality of permanent magnets 88 are secured to the outer face of the disc 84 in equicircumferentially spaced relation. Each of the magnets 88 is similarly polarized in the axial direction with respect to the disc 84; for example, with the north pole at the exterior surface and the south pole at the interior surface.

A similar plurality of magnets 89 are provided interposed one between each of the magnets 88 and similarly equicircumferentially spaced. The magnets 89 are polarized in the opposite direction with respect to the polarization of the magnets 88; that is, with the south pole at the exterior surface and the north pole at the interior surface for the previously specified polarization of magnets 88.

Although separate individual magnets 88 and 89 are shown secured to a non-magnetic disc 84, if desired, a suitable solid member might be provided with circumferentially distributed portions magnetized in accordance with the description of magnets 88 and 89.

A pair of logic switches 90 and 91 generally corresponding to those of the previous embodiment are mounted within the outer legs of the E-frame 83 on diametrically opposite portions of the disc 84, generally in alignment with the circumferential line through the magnets 88 and 89. Although switches 90 and 91 structurally correspond to the single-pole, double-throw switch units 30 and 31, previously described and shown in FIG. 6, the switches 90 and 91 are bistable units wherein a biasing magnet 92 is effective to hold the corresponding switch in either of the alternate positions but is not effective to move the switch arm to either of the two positions.

In accordance with the embodiment of FIGS. 7 and 8, a magnetic field must be provided to move the switch between the alternate positions and once so moved, the magnet 92 holds the switch in that position until an opposite magnetic field has been applied. For example, referring to switch 90, alignment of magnet 88 is effective to establish or move the arm into engagement with one of the fixed contacts. Thereafter the magnet 88 can be removed and the switch 90 remains in that stable position. The adjacent magnet 89 when aligned with the corresponding switch 90 overcomes the holding force of the biasing magnet 92 and moves the arm into engagement with the alternate fixed contact. When moved to that position, the small biasing magnet 92 is effective to hold the switch in that position after removal of the magnet 89.

In summary, the switch 90, and switch 91, is not biased to either stable position but the armature is held in the last operated position until a magnetic field of opposite polarity to that last applied is impressed on the switch.

The magnets 88 and 89 do not have to overcome a holding force as great as that in the embodiment of the previous embodiment and the actuating force of the magnets 88 and 89 can be substantially less than the magnetic force required of the permanent magnets 65 and 77 of the previous embodiment.

The magnets 88 and 89 determine the stable position of the switches 90 and 91 directly. As a result, with magnets 88 and 89 equicircumferentially spaced, the switches 90 and 91 inherently have a similar on-off period; that is, the symmetry of operation of the individual switches results from the switch construction and proper spacing of magnets 88 and 89. However, it is necessary to adjust the position of the switches 90 and 91 relative to each other in order to establish and maintain properly timed alternate operation thereof. The embodiment of the invention shown in FIGS. 7 and 8 can therefore have a somewhat simpler construction than that of the previous embodiment.

In the second embodiment of the invention, the outer legs of the E-frame 83 are similarly provided with internal recesses 93 and 94, respectively, within which the switches 90 and 91 are respectively clamped. Thus, referring particularly to switch 90, a clamping plate 95 is secured to the inner edge of the frame arm and depends inwardly into clamping engagement with the side of the switch 90. A small clamping screw 96 releasably secures the clamping plate 95 to the arm to allow releasing of switch 90 for longitudinal movement. To insure proper phasing of the switches 90 and 91, clamping plate 95 is released and the position of switch 90 adjusted until the switches are alternately actuated with the frequency of the two switches being constant, equal and displaced from each other by ninety degrees for any given flow rate through line 3.

A clamp mounting assembly 97 for switch 91 is shown similar to that of switch 90 such that either or both switches may be repositioned to obtain proper phasing. In actual practice, if desired, one of the switches could be fixedly mounted.

In both embodiments of the invention, the logic for the switching is controlled by the rotating member. Consequently, in the event there is malfunctioning at any moment and a switch does not move, the logic sequence is not broken. The stepping motor will miss one step but will immediately proceed with the continued logic sequence.

The stepping motors are relatively rugged and reliable devices that require relatively small operating currents that can be switched directly by magnetically actuated reed switches and the like. Where direct switching is not feasible however, the present pulse logic transmitter may be used to control a transistor, a silicon controlled rectifier or any other suitable amplifying circuit for the motor or other load.

The present invention thus provides a unique pulse logic transmitter establishing a proper switching sequence for direct operation of a stepper motor without the necessity of separate pulse shaping circuits, flip-flops or other logic elements and the like. The present invention is relatively inexpensive, rugged and of a long life. Although having special application and providing a unique drive for a stepper motor, the present invention may be employed in connection with other digital drive sources for establishing proper switching or pulsing.

Various modes of carrying out the invention are contemplated as being within the scope of the following claims particularly pointing out and distinctly claiming the subject matter which is regarded as the invention.

I claim:
1. An electromechanical combinator for combining of two different outputs, comprising
    a pair of stepping motors, each having a pair of field windings adapted to be energized with direct current power and establishing a stepped incremental output in response to sequential reversing of the energizing polarity of said windings,
    a differential having a first input connected to one of said motors and a second input connected to the other of said motors and having an output corresponding to the algebraic combination of the two inputs,
    a pair of switching assemblies one for each motor, each of said switching assemblies including a pair of switch means connected respectively one each to the corresponding field windings and adapted to be connected to a direct current power means for energizing of the corresponding field windings with either polarity, and
    a pair of coupling and switch actuating means each connecting one of said switching assemblies to one of said outputs, said actuating means actuating said switch means to alternately reverse the energizing polarity of the corresponding field windings.

2. The electromechanical combinator of claim 1 wherein said pair of magnetic switch assemblies each includes
    a nonmagnetic channel-shaped frame having spaced side walls defining an opening, a tubular reed switch unit releasably mounted against one side wall of the frame and having a plurality of parallel reed switch members, and a permanent magnet mounted against the opposite side wall of the frame and having an air gap adjacent thereto with a magnetic field in the direction of said switch members, and
the actuating means includes,
    a supporting base, a flat metal wheel having a plurality of equicircumferentially spaced radial slots, a shaft secured to the metal wheel and rotatably mounted in said base, a first mounting means to secure one of said switch assemblies to said base with the wheel disposed between the switch unit and the magnet, and a second mounting means to secure the other of said switch assemblies to said base with the wheel disposed between the switch unit and the magnet thereof and with the slots displaced by one-half the angle between slots with respect to the first switch assembly.

3. The electromechanical combinator of claim 1, wherein
   said switch assemblies comprise,
      a pair of tubular magnetically responsive single-pole, double-throw mercury wetted bistable switches having a contact arm moving between a pair of fixed contacts and a biasing magnet to latch the arm to either fixed contact, and
   said actuating means includes,
      a supporting base, a disc having a plurality of equicircumferentially distributed magnets polarized axially of the disc and rotatably mounted on a horizontal axis on said base, and means to vertically mount said switches circumferentially spaced in operative relation to said magnets, at least one of said switches being adjustable tangentially of the magnets for adjusting the phase between the operation of the switches.

4. In a motor operating system for actuating a stepper motor having a pair of phase windings with a common terminal and a first winding terminal and a second winding terminal and requiring polarity energization of the terminals in an alternating sequence, switching apparatus comprising,
   a first single-pole, double-throw magnetically responsive switch having a common pole adapted to be connected to said first winding terminal and having a pair of fixed contacts on opposite sides of the common pole adapted to be connected to direct current operating voltage sources of opposite polarity,
   a second single-pole, double-throw magnetically responsive switch having a common pole adapted to be connected to said second winding terminal and having a pair of fixed contacts on opposite sides of the common pole adapted to be connected to direct current operating sources of opposite polarity,
   a mounting support,
   a scanner wheel rotatably mounted in said support and having ten equicircumferentially distributed magnets polarized axially of the wheel with adjacent magnets being oppositely polarized,
   a mounting frame for said switches disposed to locate said switches adjacent one face of said wheel for alternately aligning said magnets with the switches, and
   means to adjustably secure at least one of said switches to the mounting frame for adjusting the relative position of the switch with respect to the other switch and said magnets.

5. The motor operating system of claim 4, wherein
   each of said switches is a mercury-wetted bistable switch having a reed contact arm pivotally mounted at one end and disposed between a pair of contacts at the opposite end, and
   said switches are mounted in a vertical direction with the pair of contacts in an upper position.

References Cited

UNITED STATES PATENTS

| | | | |
|---|---|---|---|
| 2,725,512 | 11/1955 | Padron | 310—99 X |
| 3,005,941 | 10/1961 | Heggen | 318—443 |
| 3,127,548 | 3/1964 | Van Emden | 310—49 X |
| 3,185,910 | 5/1965 | Knapp | 313—138 |
| 3,187,244 | 6/1965 | Summerer | 310—49 X |
| 3,189,886 | 6/1965 | Sonntag | 318—13 X |
| 3,239,738 | 3/1966 | Welch | 318—138 |

ORIS L. RADER, *Primary Examiner.*

G. SIMMONS, *Assistant Examiner.*